(12) United States Patent
Tsai

(10) Patent No.: US 12,730,274 B2
(45) Date of Patent: Sep. 8, 2026

(54) OPTICAL FIBER CONNECTOR ASSEMBLY

(71) Applicant: Gemtek Technology Co., Ltd., Hsinchu (TW)

(72) Inventor: Wei-Lun Tsai, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 283 days.

(21) Appl. No.: 18/752,639

(22) Filed: Jun. 24, 2024

(65) Prior Publication Data

US 2025/0377511 A1 Dec. 11, 2025

(30) Foreign Application Priority Data

Jun. 6, 2024 (TW) ................................ 113205942

(51) Int. Cl.
*G02B 6/42* (2006.01)

(52) U.S. Cl.
CPC ................................ *G02B 6/4292* (2013.01)

(58) Field of Classification Search
CPC ................................ G02B 6/4292
USPC ................................ 385/88
See application file for complete search history.

(56) References Cited

U.S. PATENT DOCUMENTS

2015/0043873 A1* 2/2015 Li ........................ G02B 6/3888 385/81
2015/0212278 A1* 7/2015 Lin ...................... G02B 6/3869 385/72
2018/0321448 A1* 11/2018 Wu ...................... G02B 6/3898
2022/0196930 A1* 6/2022 He ........................ G02B 6/3898
2022/0381996 A1* 12/2022 Cui ...................... G02B 6/3825
2022/0413238 A1* 12/2022 Chen .................... G02B 6/4277
2025/0028123 A1* 1/2025 Hu ........................ G02B 6/3821

* cited by examiner

*Primary Examiner* — Jerry M Blevins
(74) *Attorney, Agent, or Firm* — JCIPRNET

(57) ABSTRACT

An optical fiber connector assembly includes a main body having a body and a connecting part connected to the body, an engaging member, an elastic member, a cover, and a conductive cage. The connecting part has a groove and a socket disposed at an end away from the body. The engaging member is disposed inside the groove and extends outside the groove. The elastic member is disposed on the groove and has an elastic part extending from the elastic member to the bottom of the groove and pressing against the engaging member. The cover is rotatably disposed on the connecting part, and has an opening corresponding to the socket. The conductive cage has an elastic arm and an accommodation space. When the main body and the conductive cage are engaged with each other, the body is stored in the accommodation space, and the elastic arm presses against the engaging member.

10 Claims, 12 Drawing Sheets

100
110
150
151
151b
120b
120
131
112
120a
142
140
111a
133
112d
130

OPTICAL FIBER CONNECTOR ASSEMBLY

CROSS-REFERENCE TO RELATED APPLICATION

This application claims the priority benefit of Taiwan application serial no. 113205942, filed on Jun. 6, 2024. The entirety of the above-mentioned patent application is hereby incorporated by reference herein and made a part of this specification.

BACKGROUND

Technical Field

The disclosure relates to a connector assembly, and in particular to an optical fiber connector assembly.

Description of Related Art

Currently, with the development of science and technology, the technology of using an optical fiber to transmit information has become more popular. In order to connect the optical fiber to an electronic device so that the electronic device can transmit or receive signals through the optical fiber, it is necessary to use an optical fiber connector assembly as a medium between the optical fiber and the electronic device. However, when disassembling a connector assembly of the conventional optical fiber connector assembly, users need to directly press the connector assembly with their hands, and the applied force point is close to the connection, which is quite inconvenient for users.

SUMMARY

The disclosure provides an optical fiber connector assembly which can be quickly assembled and disassembled.

An optical fiber connector assembly of the disclosure includes a main body, an engaging member, an elastic member, a cover, and a conductive cage. The main body has a body and a connecting part connected to the body. The connecting part has a groove and a socket, and the socket is disposed at an end away from the body. The engaging member is disposed inside the groove, and has a first end and a second end opposite each other, and the second end extends outside the groove and abuts against the body. The elastic member is disposed on the groove, wherein the elastic member has an elastic part, and the elastic part extends from the elastic member to a bottom of the groove and presses against the engaging member. The cover is rotatably disposed on the connecting part, has an opening corresponding to the socket. The conductive cage has an elastic arm and an accommodation space. When the main body and the conductive cage engage with each other, the body is stored in the accommodation space, and the elastic arm presses against the second end of the engaging member.

In an embodiment of the disclosure, the engaging member further includes a supporting part located between the first end and the second end, where a distance between the supporting part and the first end is smaller than a distance between the supporting part and the second end, and the engaging member performs a lever movement with the supporting part as a fulcrum.

In an embodiment of the disclosure, the elastic part presses against between the second end and the supporting part, so that the first end is higher than the second end.

In an embodiment of the disclosure, the cover further has a protrusion extending from the cover toward a direction away from the opening, and the protrusion presses against the first end of the engaging member when the cover relative to the connecting part rotates, so that the first end presses against the bottom of the groove, and the second end of the engaging member lifts the elastic arm to separate the main body from the conductive cage.

In an embodiment of the disclosure, the engaging member further has a bending part disposed at the first end.

In an embodiment of the disclosure, the cover further has a bearing part extending from the protrusion to the bottom of the groove, and the bearing part is located between the bending part and the bottom of the groove when the main body engages with the conductive cage.

In an embodiment of the disclosure, the body further has a buckle bump, the elastic arm further has a buckle hole, and the buckle bump and the buckle hole engage with each other when the elastic arm presses against the engaging member.

In an embodiment of the disclosure, the connecting part further has a hook and a positioning bump respectively protruding from two opposite sides of the connecting part.

In an embodiment of the disclosure, the elastic member further includes a fastening hole and a positioning hole disposed on two opposite sides of the elastic member, and the fastening hole is adapted to engage with the hook, so that the elastic member is fixed on the connecting part, and the positioning hole is adapted to accommodate the positioning bump.

In an embodiment of the disclosure, the connecting part is connected to an optical fiber cable by the socket.

Based on the above, the optical fiber connector assembly of the disclosure makes the engaging member lift the elastic arm by rotating the cover to separate the main body from the conductive cage. Accordingly, when the optical fiber connector assembly is to be separated, the cover relative to the body can directly rotates, and the body and conductive cage can be quickly released from the buckling state.

In order to make the aforementioned features and advantages of the disclosure comprehensible, embodiments accompanied with drawings are described in detail below.

DESCRIPTION OF THE EMBODIMENTS

Figure 1A:
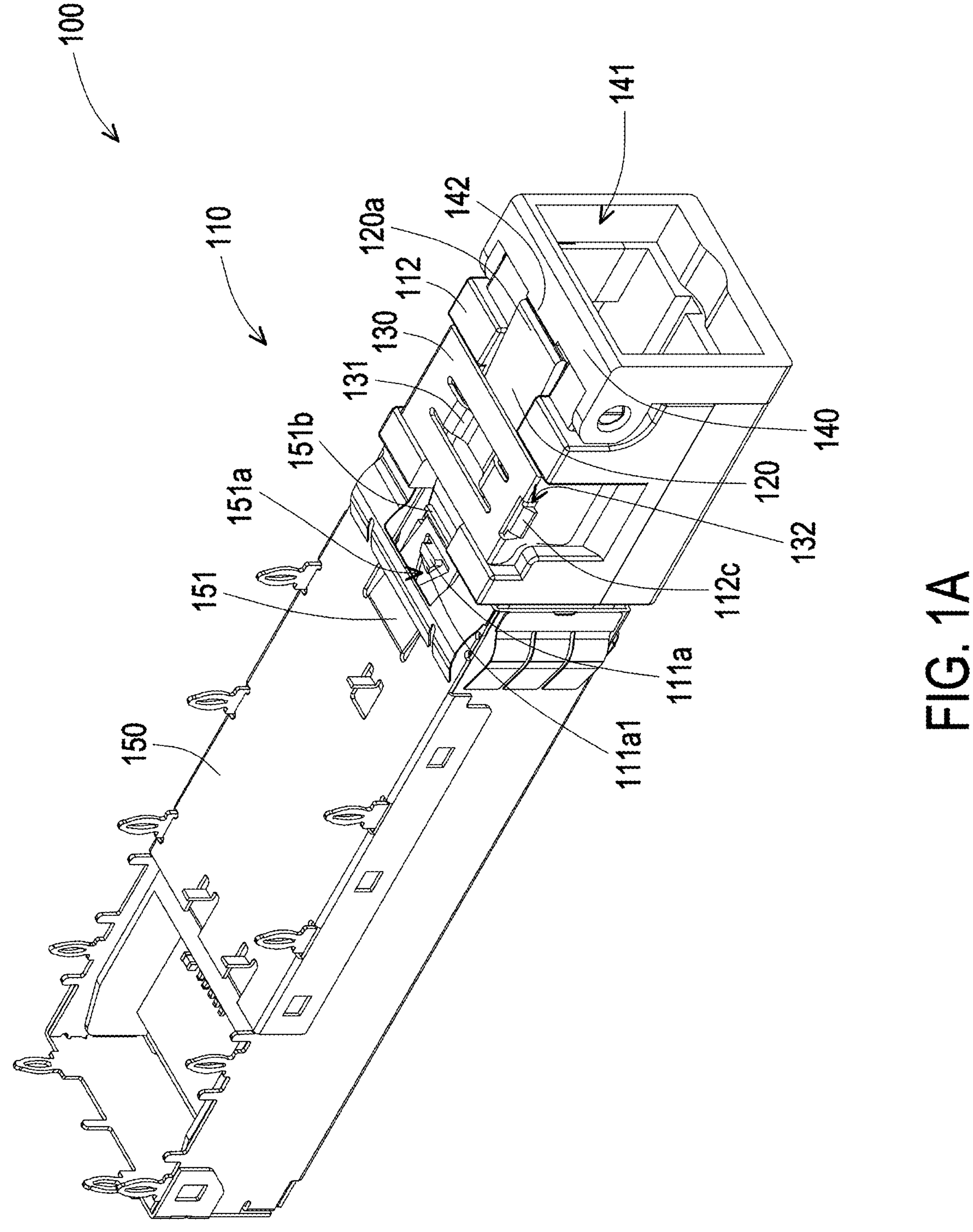
FIG. 1A is a schematic view of an optical fiber connector assembly according to an embodiment of the disclosure.
Figure 1B:
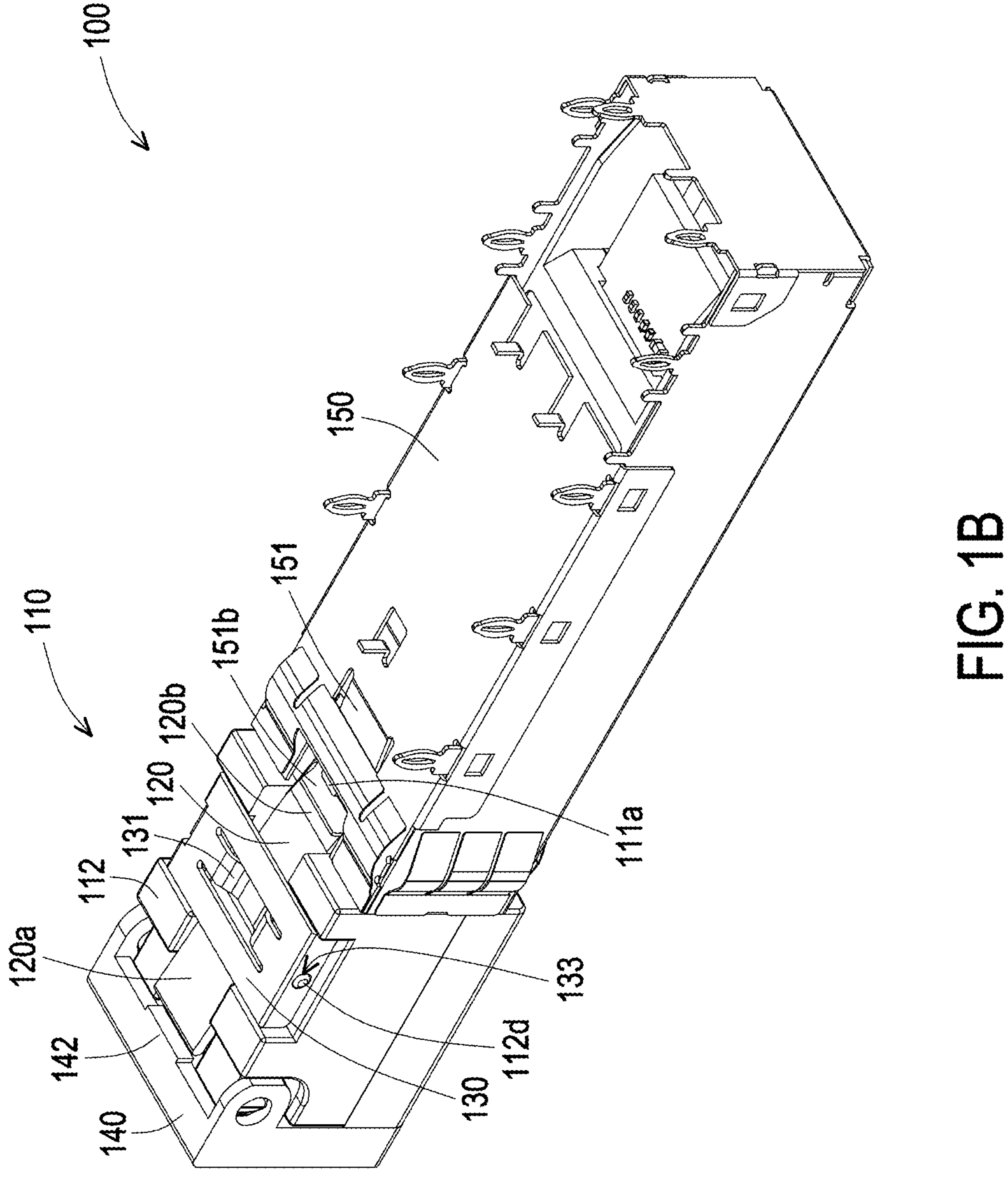
FIG. 1B is a schematic view of FIG. 1A from another perspective.
Figure 1C:
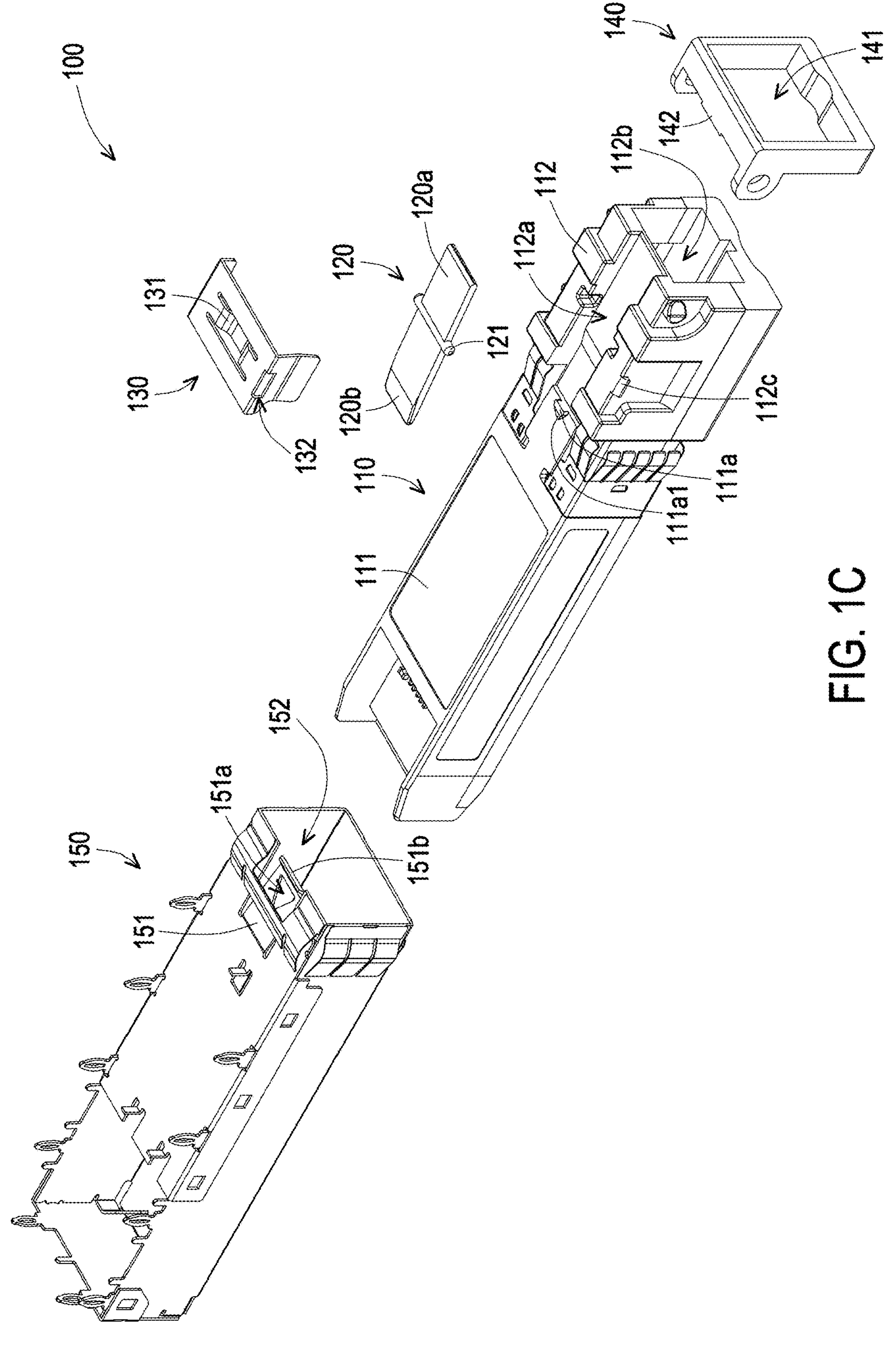
FIG. 1C is an exploded view of the optical fiber connector assembly in FIG. 1A.
Figure 1D:
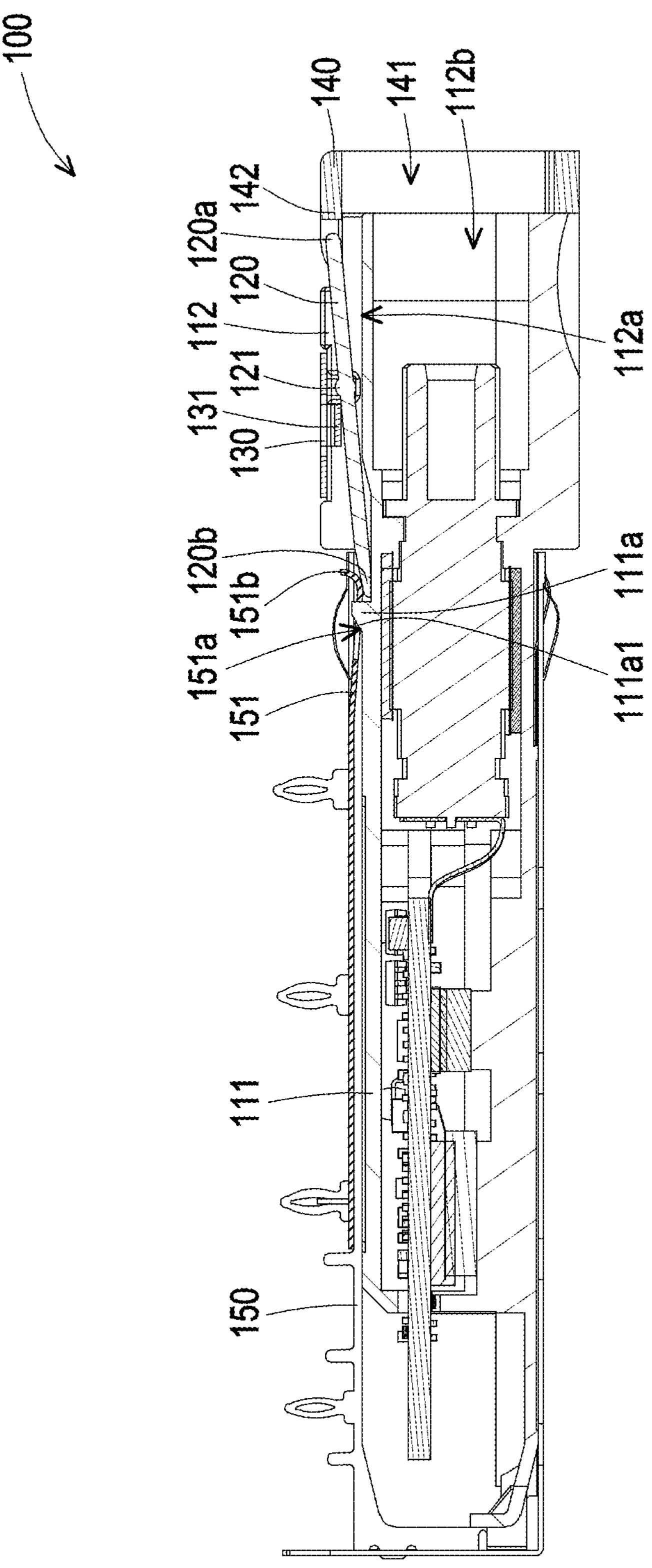
FIG. 1D is a cross-sectional view of FIG. 1A.

FIG. 1A is a schematic view of an optical fiber connector assembly according to an embodiment of the disclosure. FIG. 1B is a schematic view of FIG. 1A from another perspective. FIG. 1C is an exploded view of the optical fiber connector assembly in FIG. 1A. FIG. 1D is a cross-sectional view of FIG. 1A. Referring to FIG. 1A, FIG. 1B, FIG. 1C, and FIG. 1D together, an optical fiber connector assembly 100 includes a main body 110, an engaging member 120, an elastic member 130, a cover 140, and a conductive cage 150. The main body 110 has a body 111 and a connecting part 112 connected to the body 111. The connecting part 112 has a groove 112*a* and a socket 112*b*, and the socket 112*b* is disposed at an end away from the body 111. The engaging member 120 is disposed inside the groove 112*a*. The engaging member 120 has a first end 120*a* and a second end 120*b* opposite to each other, and the second end 120*b* extends outside the groove 112*a* and abuts against the body 111. The elastic member 130 is disposed on the groove 112*a*, and has an elastic part 131. The elastic part 131 extends from the elastic member 130 to a bottom of the groove 112*a* and presses against the engaging member 120. The cover 140 is rotatably disposed on the connecting part 112, and has an opening 141 and a protrusion 142. The opening 141 corresponds to the socket 112*b*, and the protrusion 142 extends from the cover 140 toward a direction of the engaging member 120. The conductive cage 150 has an elastic arm 151 and an accommodation space 152. When the main body 110 and the conductive cage 150 engage with each other, the body 111 is stored in the accommodation space 152, and the elastic arm 151 presses against the second end 120*b* of the engaging member 120.

In detail, the engaging member 120 further includes a supporting part 121, and the supporting part 121 is located between the first end 120*a* and the second end 120*b*. In this embodiment, a distance between the supporting part 121 and the first end 120*a* is smaller than a distance between the supporting part 121 and the second end 120*b*. In addition, the elastic part 131 presses against between the second end 120*b* and the supporting part 121 of the engaging member 120, so that the first end 120*a* is higher than the second end 120*b*, and the engaging member 120 is fixed in the groove 112*a*. That is, in other embodiments, the distance between the supporting part 121 and the first end 120*a* may be greater than or equal to the distance between the supporting part 121 and the second end 120*b*. As long as the elastic part 131 presses against between the second end 120*b* of the engaging member 120 and the supporting part 121 to make the engaging member 120 be fixed in the groove 112*a*, the first end 120*a* is higher than the second end 120*b*. The disclosure is not limited thereto.

In this embodiment, the body 111 further has a buckle bump 111*a*, and the buckle bump 111*a* has a bump bevel 111*al*. The bump bevel 111*al* faces toward a direction of the elastic arm 151, and the buckle bump 111*a* is disposed close to the second end 120*b* of the engaging member 120. The elastic arm 151 has a buckle hole 151*a* and an elastic bending part 151*b*. The elastic arm 151 extends from a surface of the conductive cage 150 toward a direction of the accommodation space 152, and the buckle hole 151*a* is adaptable for engaging with the buckle protrusion 111*a*. When the main body 110 is to be engaged with the conductive cage 150, the elastic arm 151 is lifted along the bump bevel 111*al* and then presses against the second end 120*b* of the engaging member 120, so that the engaging member 120 is fixed under the elastic arm 151. At this time, the buckle bump 111*a* engages with the buckle hole 151*a*, making the main body 110 and the conductive cage 150 engage with each other.

Figure 1E:
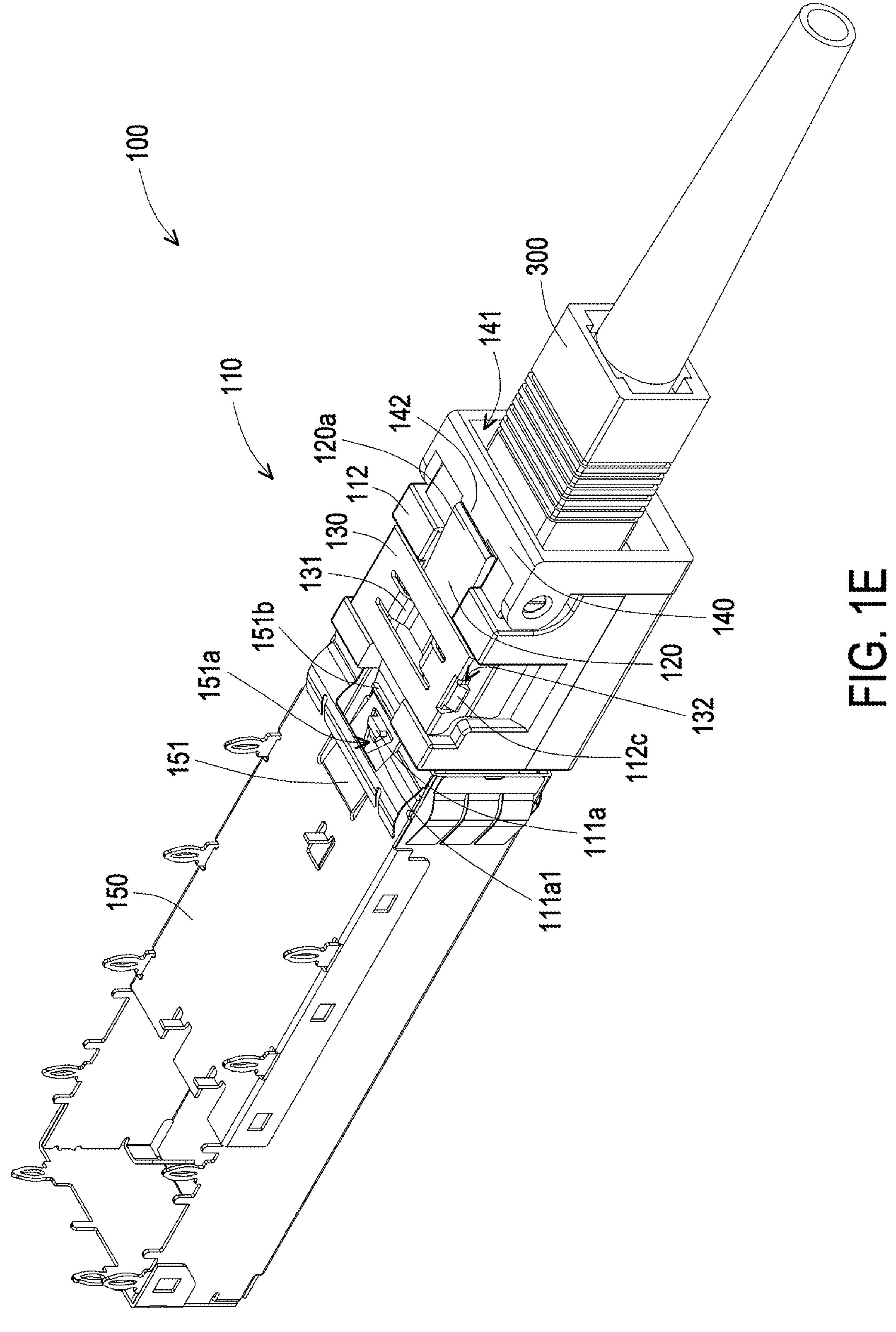
FIG. 1E is a schematic view of an optical fiber cable connected by the optical fiber connector assembly in FIG. 1A.

FIG. 1E is a schematic view of an optical fiber cable connected by the optical fiber connector assembly in FIG. 1A. Referring to FIG. 1A, FIG. 1B, and FIG. 1E together, in this embodiment, the connecting part 112 further has a hook 112*c* and a positioning bump 112*d*, which are respectively disposed on two opposite sides of the connecting part 112. In addition, the elastic member 130 further includes a fastening hole 132 and an positioning hole 133, which are disposed on two opposite sides of the elastic member 130. The fastening hole 132 is adaptable for engaging with the hook 112*c*, and the positioning hole 133 is adaptable for accommodating the positioning bump 112*d*, so that the elastic member 130 is fixed on the connecting part 112. Specifically, when the elastic member 130 is to be fixed on the connecting part 112, the positioning hole 133 is first aligned with the positioning bump 112*d*, and then the buckle hole 132 engages with the hook 112*c*. At this time, the elastic part 131 presses against on the engaging member 120 and fix the engaging member 120 in the groove 112*a*. In this embodiment, the elastic member 130 is made of metal material. In other embodiments, the elastic member 130 may also be made of other materials. As long as the elastic member 130 has elasticity, the disclosure is not limited thereto. In addition, an optical fiber cable 300 is connected to the connecting part 112 by the opening 141 and the socket 112*b*.

Figure 2A:
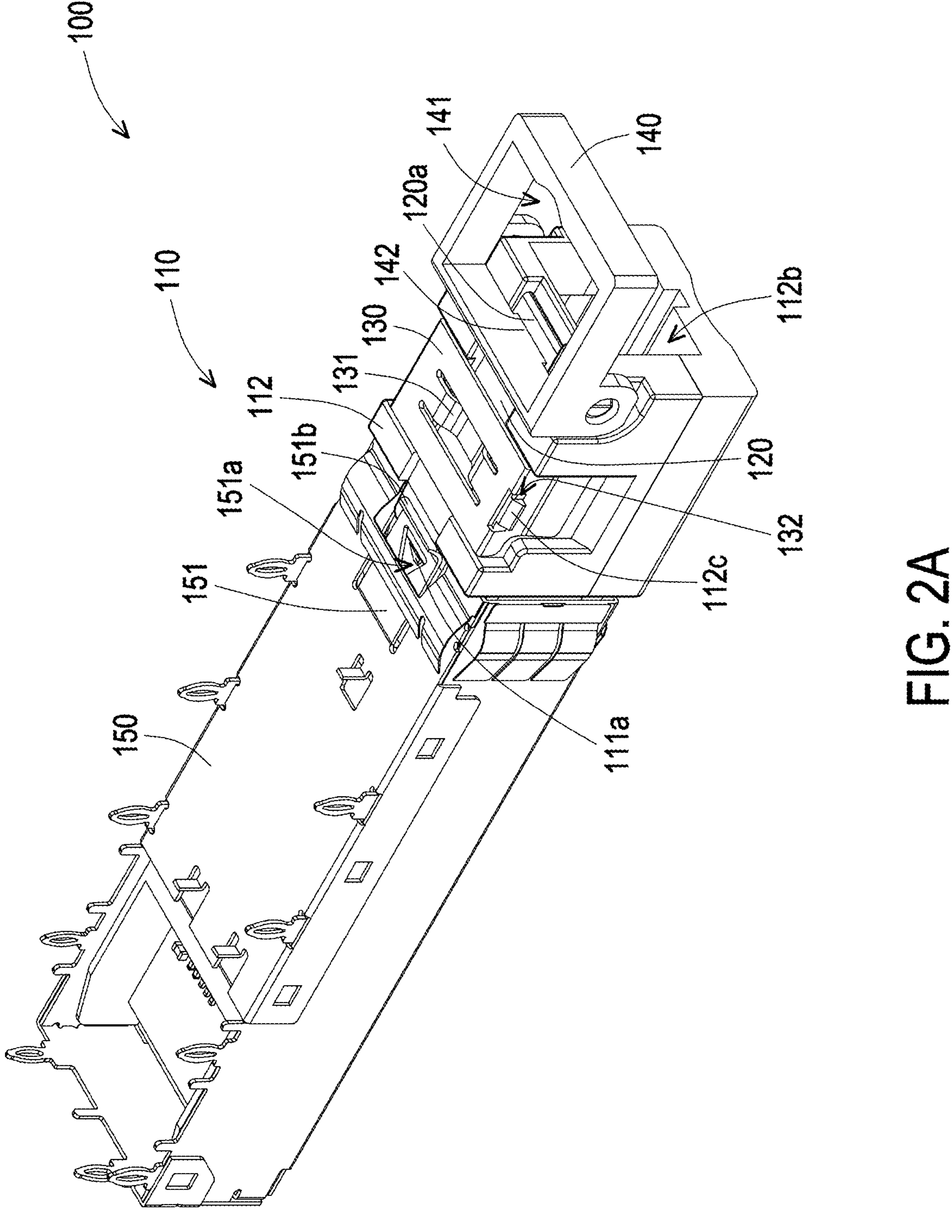
FIG. 2A is a schematic view of cover rotation of the optical fiber connector assembly in FIG. 1A.
Figure 2B:
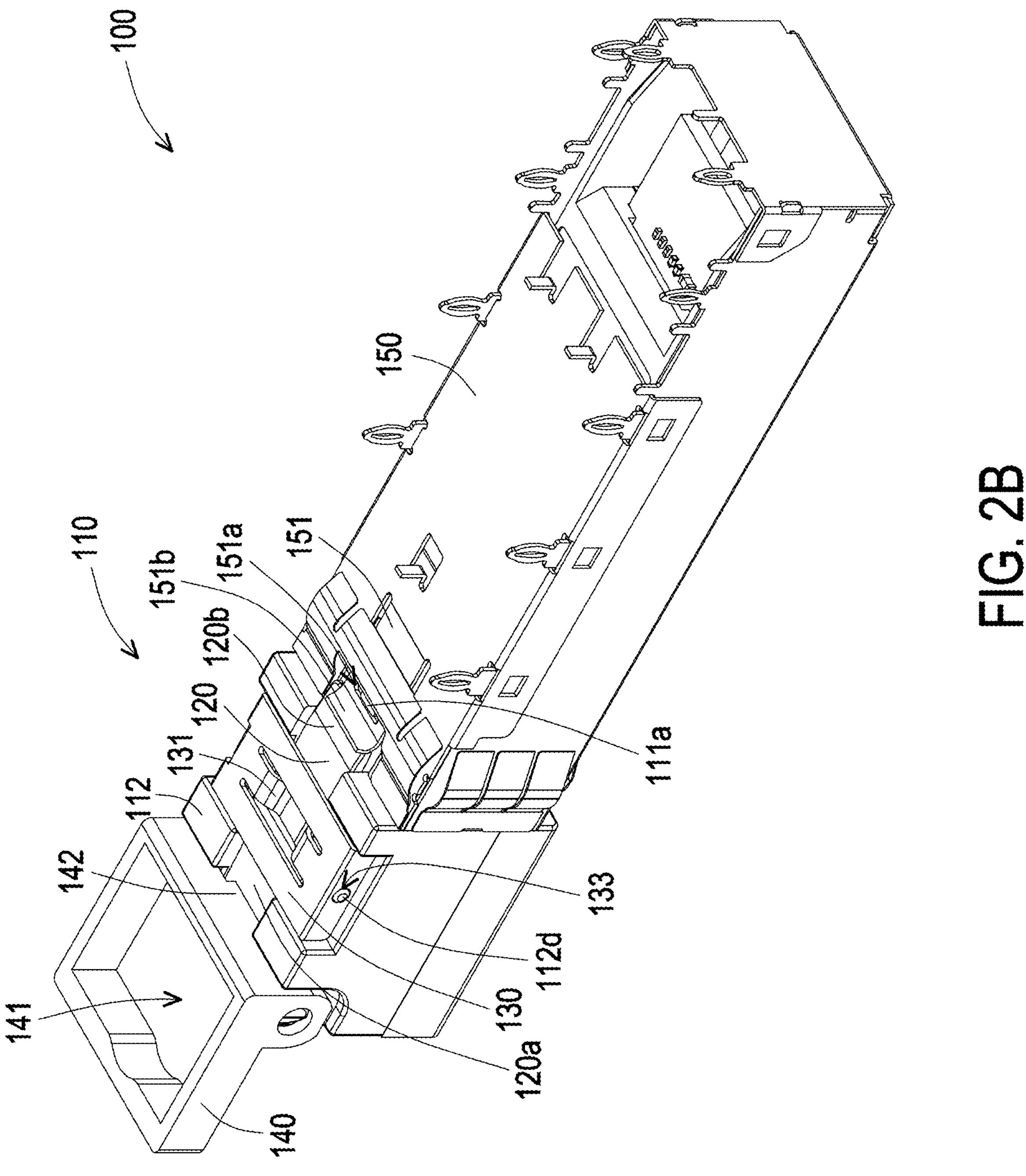
FIG. 2B is a schematic view of FIG. 2A from another perspective.
Figure 2C:
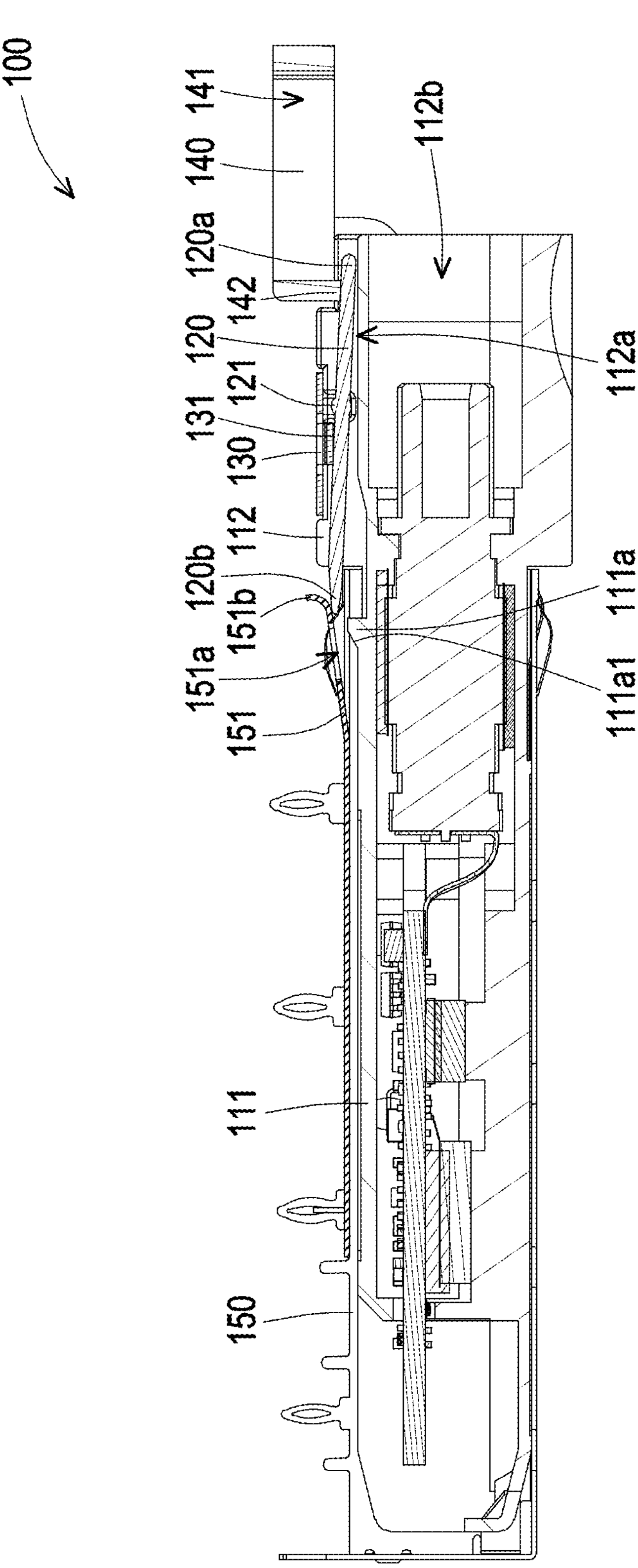
FIG. 2C is a cross-sectional view of FIG. 2A.

FIG. 2A is a schematic view of cover rotation of the optical fiber connector assembly in FIG. 1A. FIG. 2B is a schematic view of FIG. 2A from another perspective. FIG. 2C is a cross-sectional view of FIG. 2A. Referring to FIG. 2A, FIG. 2B, and FIG. 2C together, when the cover 140 relative to the connecting part 112 rotates, the protrusion 142 presses against the first end 120*a* of the engaging member 120, and makes the second end 120*b* of the engaging member 120 higher than the first end 120*a*. When the second end 120*b* of the engaging member 120 is lifted, the elastic arm 151 pressed against the second end 120*b* is also lifted, so that the buckle bump 111*a* is separated from the buckle hole 151*a*, so as to make the main body 110 disconnect to the conductive cage 150. In detail, when the elastic part 130 is fixed on the connecting part 112, the elastic part 131 presses against between the second end 120*b* of the engaging part 120 and the supporting part 121, so that the second end 120*b* of the engaging part 120 abuts against the body 111. After the cover 140 relative to the connecting part 112 rotates, the protrusion 142 presses against the first end 120*a* of the engaging member 120, which causes the first end 120*a* of the engaging member 120 to abut against the bottom of the groove 112*a*, and makes the second end 120*b* higher than the first end 120*a* to lift the elastic arm 151. That is, the engaging member 120 performs a lever movement by the cover 140 and the elastic member 130 with the supporting part 121 as a fulcrum.

Figure 3A:
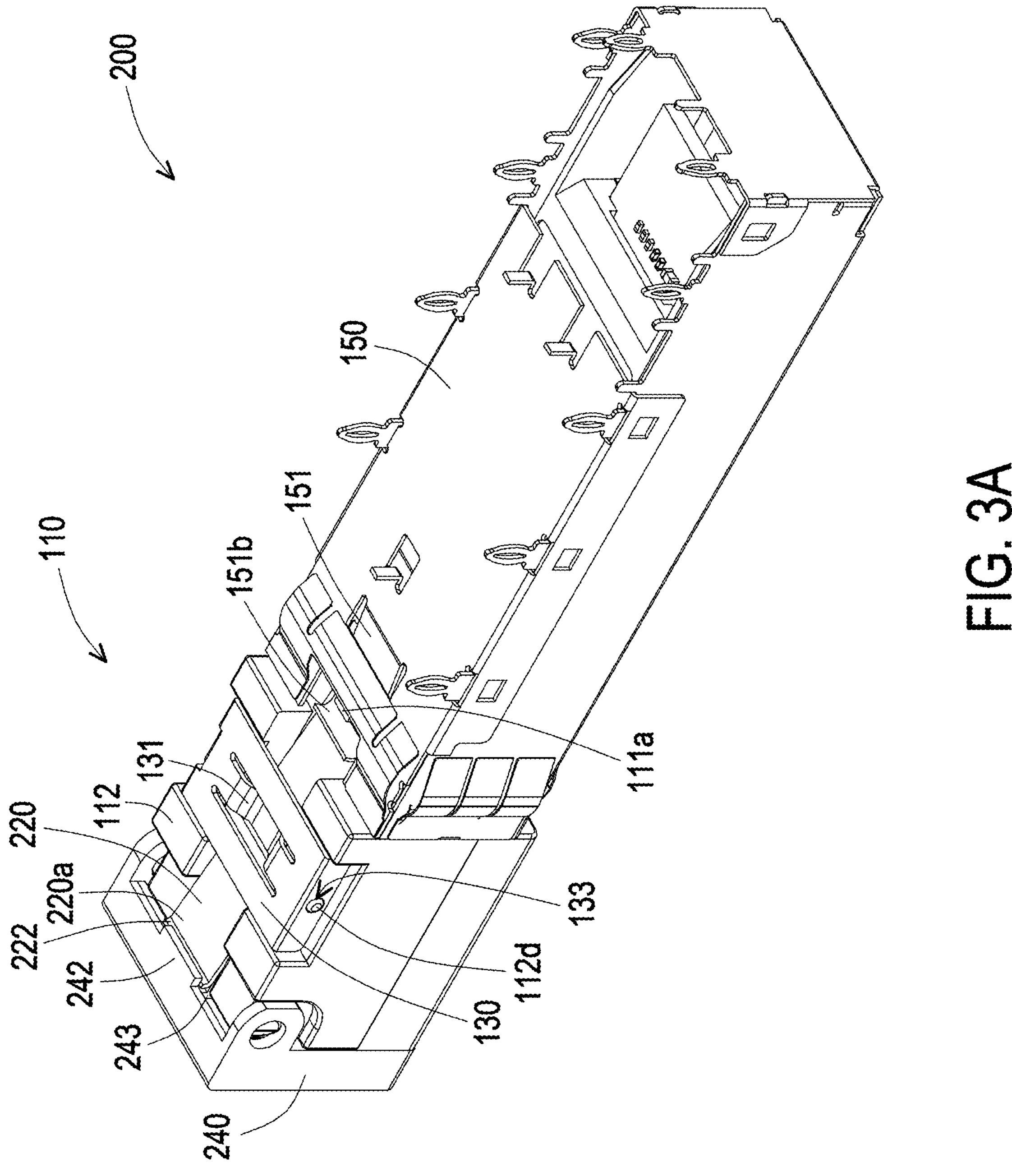
FIG. 3A is a schematic view of an optical fiber connector assembly according to another embodiment of the disclosure.
Figure 3B:
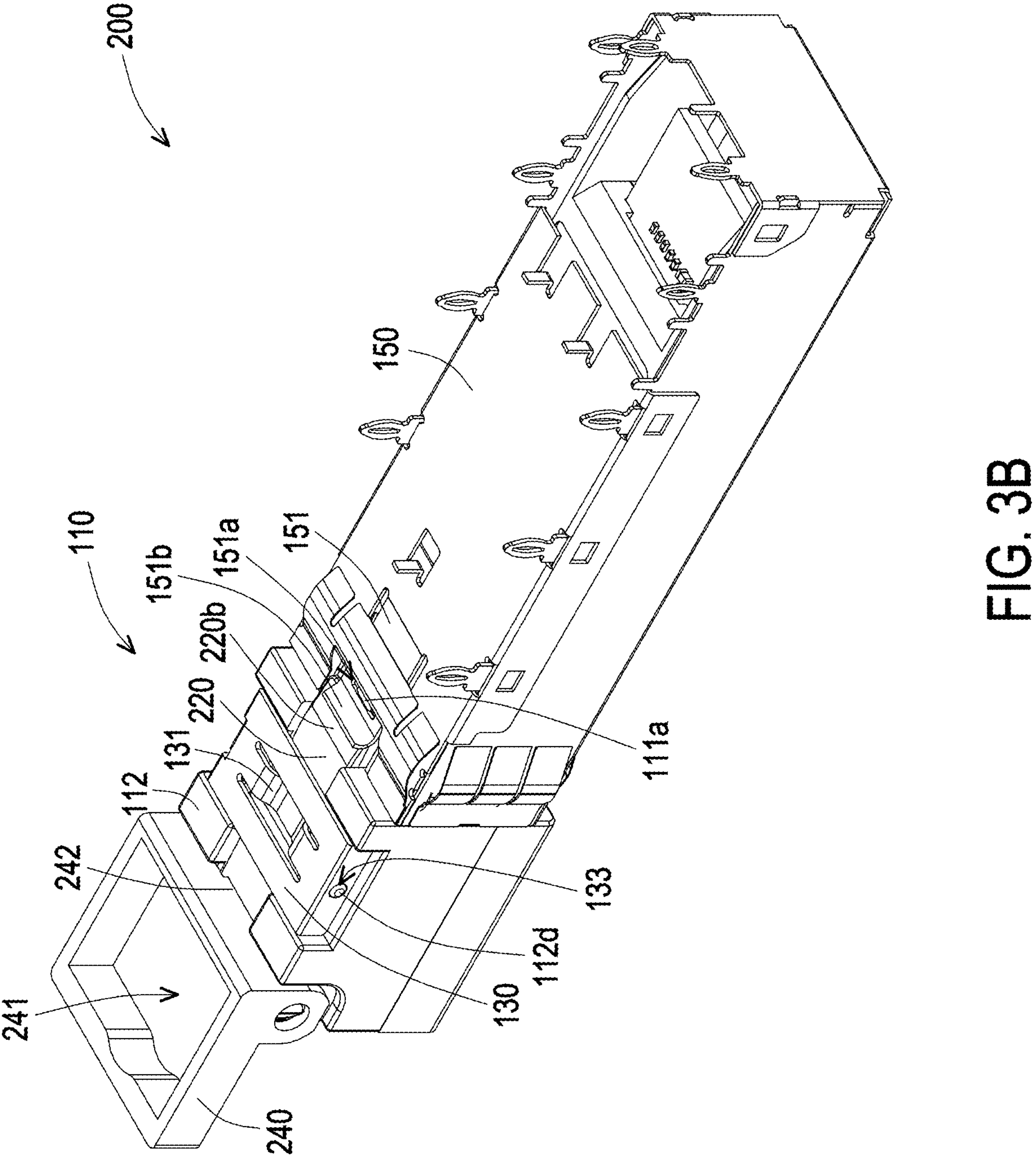
FIG. 3B is a schematic view of cover rotation of the optical fiber connector assembly in FIG. 3A.
Figure 3C:
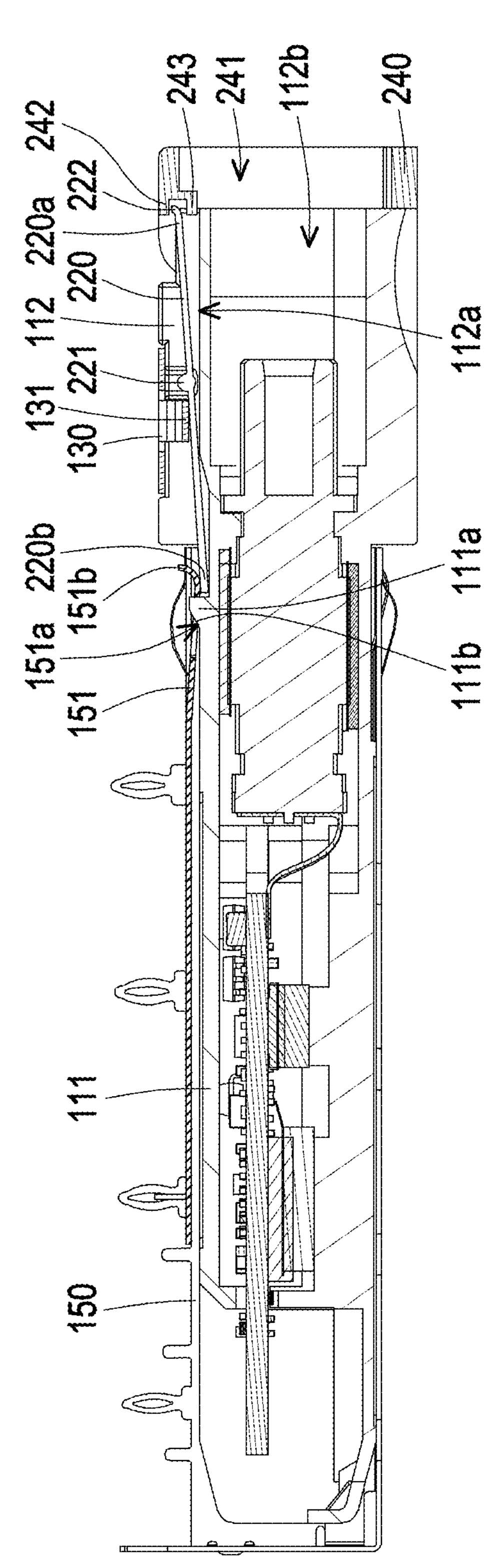
FIG. 3C is a cross-sectional view of FIG. 3A.
Figure 3D:
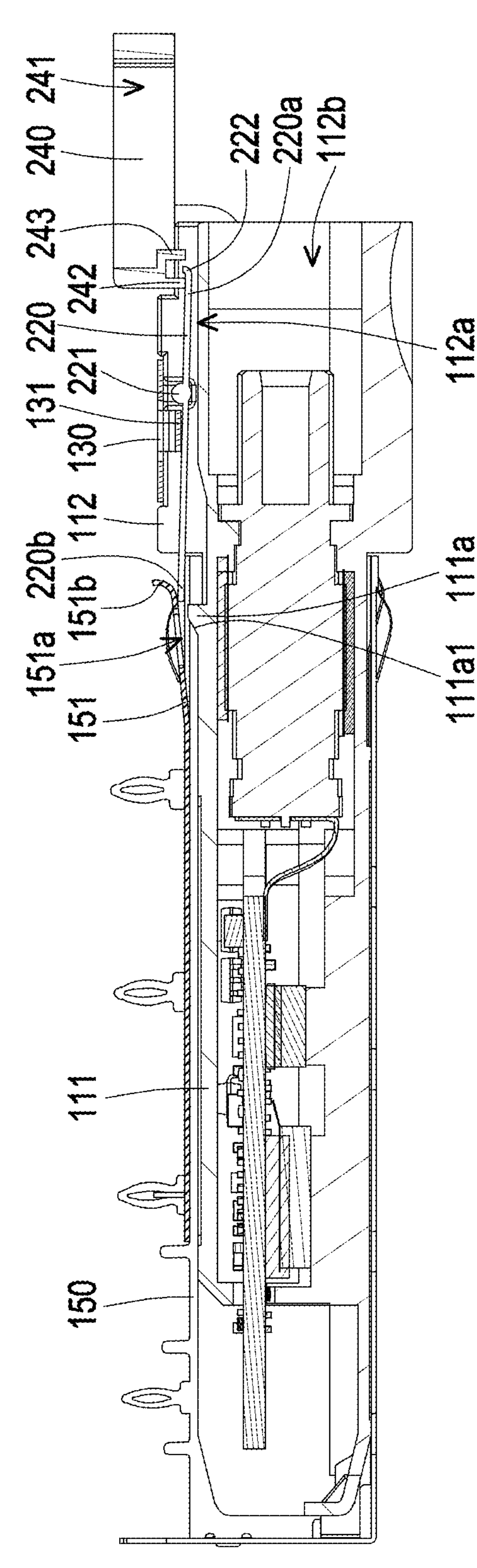
FIG. 3D is a cross-sectional view of FIG. 3B.

FIG. 3A is a schematic view of an optical fiber connector assembly according to another embodiment of the disclosure. FIG. 3B is a schematic view of cover rotation of the optical fiber connector assembly in FIG. 3A. FIG. 3C is a cross-sectional view of FIG. 3A. FIG. 3D is a cross-sectional view of FIG. 3B. Please refer to FIG. 3A, FIG. 3B, FIG. 3C, and FIG. 3D together, which illustrate another embodiment that is substantially the same as the embodiment of FIG. 1A.

The difference between the two lies in that in an optical fiber connector assembly 200 of this embodiment, an engaging part 220 further has a bending part 222 disposed at a first end 220*a* of the engaging part 220, and extending from the engaging part 220 toward a direction away from the bottom of the groove 112*a*. In addition, in this embodiment, the cover 240 further has a bearing part 243 extending from a protrusion 242 toward a direction of the bottom of the groove 112*a*. In detail, the elastic part 131 of the elastic member 130 presses against between the supporting part 221 and the second end 220*b*, making the first end 220*a* lifted, and the bending part 222 located between the supporting part 243 and the protruding part 242. When the cover 240 relative to the connecting part 112 does not rotate, the bending part 222 abuts against the supporting part 243. When the cover 240 relative to the connecting part 112 rotates, the protrusion 242 abuts against the first end 220*a* of the engaging member 220, and the bending part 222 is located between the protrusion 242 and the supporting part 243. That is, the protrusion 242 and the bearing part 243 relative to the bending part 222 rotate, making the bending part 222 always be located between the protrusion 242 and the bearing part 243 to prevent the engaging member 220 and the cover 240 from getting stuck with each other and unable to move.

To sum up, the optical fiber connector assembly of the disclosure makes the engaging member lift the elastic arm by rotating the cover to separate the main body from the conductive cage. Accordingly, when the optical fiber connector assembly is to be separated, the cover relative to the body can directly rotates, and the main body and conductive cage can be quickly released from the buckling state.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. An optical fiber connector assembly, comprising:

a main body, having a body and a connecting part connected to the body, wherein the connecting part has a groove and a socket, and the socket is disposed at an end away from the body;

an engaging member, disposed inside the groove, wherein the engaging member has a first end and a second end opposite each other, and the second end extends outside the groove and abuts against the body, an elastic member, disposed on the groove, wherein the elastic member has an elastic part, and the elastic part extends from the elastic member to a bottom of the groove and presses against the engaging member;

a cover, rotatably disposed on the connecting part, wherein the cover has an opening corresponding to the socket; and a conductive cage, having an elastic arm and an accommodation space, wherein when the main body and the conductive cage engage with each other, the body is stored in the accommodation space, and the elastic arm presses against the second end of the engaging member.

2. The optical fiber connector assembly according to claim 1, wherein the engaging member further comprises a supporting part located between the first end and the second end, a distance between the supporting part and the first end is smaller than a distance between the supporting part and the second end, and the engaging member performs a lever movement with the supporting part as a fulcrum.

3. The optical fiber connector assembly according to claim 2, wherein the elastic part presses against between the second end and the supporting part, so that the first end is higher than the second end.

4. The optical fiber connector assembly according to claim 1, wherein the cover further has a protrusion extending from the cover toward a direction away from the opening, and the protrusion presses against the first end of the engaging member when the cover relative to the connecting part rotates, so that the first end presses against the bottom of the groove, and the second end of the engaging member lifts the elastic arm to separate the main body from the conductive cage.

5. The optical fiber connector assembly according to claim 4, wherein the engaging member further has a bending part disposed at the first end.

6. The optical fiber connector assembly according to claim 5, wherein the cover further has a bearing part extending from the protrusion to the bottom of the groove, and the bearing part is located between the bending part and the bottom of the groove when the main body engages with the conductive cage.

7. The optical fiber connector assembly according to claim 1, wherein the body further has a buckle bump, the elastic arm further has a buckle hole, and the buckle bump and the buckle hole engage with each other when the elastic arm presses against the engaging member.

8. The optical fiber connector assembly according to claim 1, wherein the connecting part further has a hook and a positioning bump respectively protruding from two opposite sides of the connecting part.

9. The optical fiber connector assembly according to claim 8, wherein the elastic member further comprises a fastening hole and a positioning hole disposed on two opposite sides of the elastic member, and the fastening hole is adapted to engage with the hook, so that the elastic member is fixed on the connecting part, and the positioning hole is adapted to accommodate the positioning bump.

10. The optical fiber connector assembly according to claim 1, wherein the connecting part is connected to an optical fiber cable by the socket.

* * * * *